United States Patent [19]
Dufour

[11] Patent Number: 6,073,010
[45] Date of Patent: Jun. 6, 2000

[54] SYSTEM AND METHOD FOR RESTRICTING MOBILITY OF SUBSCRIBERS ASSIGNED TO FIXED SUBSCRIPTION AREAS IN A CELLULAR TELECOMMUNICATIONS NETWORK

[75] Inventor: Daniel Dufour, Blainville, Canada

[73] Assignee: Telefonaktiebolaget LM Ericsson (publ), Stockholm, Sweden

[21] Appl. No.: 08/955,998

[22] Filed: Oct. 22, 1997

Related U.S. Application Data

[63] Continuation-in-part of application No. 08/430,831, Apr. 28, 1995, abandoned.

[51] Int. Cl.⁷ .................................................. H04Q 7/20
[52] U.S. Cl. .......................... 455/422; 455/432; 455/433
[58] Field of Search .................................. 455/422, 421, 455/432, 517, 433

[56] References Cited

U.S. PATENT DOCUMENTS

| | | | |
|---|---|---|---|
| 5,134,708 | 7/1992 | Marui et al. | 455/33.2 |
| 5,175,867 | 12/1992 | Wejke et al. | 455/33.1 |
| 5,223,815 | 6/1993 | Rosenthal et al. | 340/539 |
| 5,283,550 | 2/1994 | MacIntyre | 340/539 |
| 5,303,286 | 4/1994 | Wiedeman | 379/59 |
| 5,335,265 | 8/1994 | Cooper et al. | 379/59 |
| 5,345,499 | 9/1994 | Benveniste | 379/59 |
| 5,361,297 | 11/1994 | Ortiz et al. | 379/130 |
| 5,444,765 | 8/1995 | Marui et al. | 455/432 |
| 5,450,613 | 9/1995 | Takahara et al. | 455/517 |
| 5,469,496 | 11/1995 | Emery et al. | 379/58 |
| 5,732,347 | 3/1998 | Bartle et al. | 455/421 |
| 5,802,468 | 9/1998 | Gallant et al. | 455/422 |

FOREIGN PATENT DOCUMENTS

| | | |
|---|---|---|
| 0 505 106 A2 | 9/1992 | European Pat. Off. ......... H04Q 7/04 |
| 505106 A2 | 9/1992 | United Kingdom . |
| WO 96/27996 | 9/1996 | WIPO . |
| WO 97/03531 | 1/1997 | WIPO . |

Primary Examiner—Thanh Cong Le
Assistant Examiner—Myron K. Wyche
Attorney, Agent, or Firm—Smith & Danamraj, P.C.

[57] ABSTRACT

A system and method of restricting an on-going call of a fixed subscriber to a fixed subscription area (FSA) in a cellular telecommunication system having a plurality of cells and a plurality of subscribers. The plurality of subscribers includes at least one fixed subscriber assigned to the FSA and engaged in an on-going call in a serving cell. The system and method detect when the fixed subscriber is crossing a cell border between the serving cell and a neighbor cell, determine whether the neighbor cell is located in the FSA, and drop the on-going call of the fixed subscriber upon determining that the neighbor cell is located outside the FSA.

25 Claims, 5 Drawing Sheets

SYSTEM AND METHOD FOR RESTRICTING MOBILITY OF SUBSCRIBERS ASSIGNED TO FIXED SUBSCRIPTION AREAS IN A CELLULAR TELECOMMUNICATIONS NETWORK

RELATED APPLICATIONS

This application is a continuation-in-part of U.S. patent application Ser. No. 08/430,831 filed Apr. 28, 1995, now abandoned.

BACKGROUND OF THE INVENTION

1. Technical Field of the Invention

This invention relates to cellular radio telecommunication systems and, more particularly, to a system and method of for restricting the mobility of subscribers assigned to fixed subscription areas (FSAs) in a cellular telecommunications network.

2. Description of Related Art

As the use of cellular telephones spreads, the number of network operators who compete to provide telecommunication services to subscribers is also increasing. Each operator, moreover, desires to offer unique services which distinguish the operator from its competitors. One such way to distinguish the service provided to subscribers is to offer increased levels of individual service tailoring. Today, only limited tailoring of individual services has been implemented. For example, operators may now offer subscribers a choice of subscription areas such as having cellular service only in a downtown area, or for a higher cost, having service which includes both the downtown area and the suburbs as well. Subscribers with geographically limited access rights are referred to as "fixed subscribers" and are generally equipped with either a fixed cellular terminal or a mobile station.

A major problem with existing methods of limiting individual service to a geographic area is that the limits are only effective at system access, i.e., call origination or termination. Existing cellular systems perform a verification process to determine if a subscriber is authorized to place or receive a call from the cell in which the subscriber is located, but the verification process is only performed at system access. Existing systems do not perform subscriber verification at handoff; therefore, once a fixed subscriber places a call in an authorized geographic area, the subscriber may continue the call, even if the subscriber roams outside the authorized area. Thus, once a call is in progress, a fixed subscriber may roam from cell to cell throughout the entire coverage area of the network.

System operators obviously lose revenue when fixed subscribers pay a lower fee for a restricted subscription area and then roam freely into unauthorized areas once calls are begun. However, this unauthorized roaming also causes another serious problem. The cellular system is programmed with information that indicates that a fixed subscriber is limited to operating within the subscriber's restricted or fixed subscription area (FSA). For purposes of the present invention, an FSA is defined as one or more regions of cells within which fixed subscribers are allowed to roam and receive and place calls. The cells may all be of equal size, or may be of different sizes. When a voice channel is assigned to the fixed subscriber, the cellular system may also assign the same channel or adjacent channels to subscribers in areas outside the fixed subscriber's FSA. If the fixed subscriber remains within the authorized FSA, there is normally no problem. However, if the fixed subscriber roams outside the authorized FSA, there is a higher chance of co-channel and adjacent channel interference between authorized subscribers in that area and the unauthorized fixed subscriber.

For a cellular system to control both fixed subscribers and mobile subscribers, the system must be able to identify each type of subscriber and access information regarding each fixed subscriber's authorized FSA. European Patent Application 0 505 106 A2 by Vodafone (Vodafone) utilizes the "classmark" (RF transmitter power) of the subscriber's mobile station to distinguish a regular mobile station from a microcellular mobile station. In this manner, the Vodafone system is alerted if a microcellular subscriber attempts to access the network in a cell which is not a microcell. However, the Vodafone method of utilizing the classmark is useless when the cells in the FSA and bordering cells are of equal size.

Additionally, when required, cellular systems must be prohibited from handing off fixed subscribers to cells outside their FSA. For fixed subscribers with subscription areas comprising a single cell, this means the system may not allow handoffs of those subscribers at all. The cellular systems must, at the same time, allow handoffs of fixed subscribers between authorized cells in FSAs comprising more than one cell, while prohibiting handoff to cells outside the FSA. Meanwhile, normal (unrestricted) mobile subscribers must be able to roam freely to any cell of their choosing. To avoid co-channel and adjacent channel interference between single-cell fixed subscribers, multi-cell fixed subscribers, and mobile subscribers with unrestricted mobility, a mechanism is needed to limit the mobility of fixed subscribers after a call is initiated.

It would be a distinct advantage to have a cellular radio telecommunication system with the capability to identify and drop calls from fixed subscribers who travel out of their authorized FSAs after a call is initiated, and enter cells of equal size. Additionally, it would be advantageous for such a cellular system to provide a warning to fixed subscribers during the call that their call may be dropped. The present invention provides such a system.

SUMMARY OF THE INVENTION

In one aspect, the present invention is a cellular telecommunication system which detects subscribers crossing handoff borders and either enables a handoff function or disables the handoff function and drops the call.

In another aspect, the present invention is a cellular telecommunication system having a plurality of cells and a plurality of subscribers utilizing cellular telephones of approximately equal radio frequency transmitter power to access the cellular system. The plurality of subscribers includes at least one fixed subscriber assigned to a fixed subscription area (FSA) engaged in an on-going call in a serving cell. The system includes a mobile switching center (MSC) which includes a database defining which of the plurality of cells are included in the FSA, and a home location register (HLR) that stores a subscriber profile for each of the plurality of subscribers. Each subscriber profile identifies whether an associated subscriber is a fixed subscriber or a normal subscriber. The system also includes means for sending an inquiry from the MSC to the HLR to determine whether a subscriber is a normal subscriber or a fixed subscriber. A plurality of base stations are electronically connected to the MSC, each of the base stations transmitting radio frequency signals over a coverage area defining one of the cells, and receiving radio frequency signals from the cellular telephones of approximately equal radio frequency transmitter power. Finally, the system includes a restricted mobility function for restricting the on-going call of the fixed subscriber to the FSA.

In another aspect, the present invention is a cellular telecommunication system having a plurality of cells and a plurality of subscribers. The plurality of subscribers includes at least one fixed subscriber assigned to a fixed subscription area (FSA) engaged in an on-going call in a serving cell. The system includes a mobile switching center (MSC), and a plurality of base stations electronically connected to the MSC and transmitting radio frequency signals over coverage areas defining the cells. The coverage areas of the cells within the FSA, and of cells bordering the FSA, may be of approximately equal size. The system also includes a restricted mobility function for restricting the on-going call of the fixed subscriber to the FSA.

In another aspect, the present invention is a method in a cellular telecommunication system of restricting an on-going call of a fixed subscriber to a fixed subscription area (FSA). The cellular telecommunications system includes a serving mobile switching center (MSC), a home location register (HLR), a plurality of cells, and the FSA. The method begins by receiving radio frequency transmissions from a plurality of subscribers utilizing cellular telephones of approximately equal radio frequency transmitter power to access the cellular system. The plurality of subscribers includes the fixed subscriber assigned to the FSA. The method also defines, in a subscriber profile stored in the HLR, whether each of the plurality of subscribers is a fixed subscriber assigned to the FSA. This is followed by detecting when one of the plurality of subscribers is crossing a cell border between a serving cell and a neighbor cell, sending an inquiry from the serving MSC to the HLR to determine whether the subscriber crossing the cell border is a fixed subscriber assigned to the FSA, and determining, from a database in the MSC, whether the neighbor cell is located in the FSA. This is followed by dropping the on-going call of the fixed subscriber upon determining that the subscriber crossing the cell border is a fixed subscriber assigned to the FSA and the neighbor cell is located outside the FSA.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention comprises a cellular radio telecommunication system which detects subscribers crossing handoff borders and either enables a handoff function or disables the handoff function and drops the call. The decision to handoff or drop depends on the subscriber's status, whether a restricted mobility function is active in the subscriber's serving cell, the border being crossed, and the number of times the system detects the subscriber at the handoff boundary within a predetermined period of time.

A new restricted mobility function which includes a "Call Out of Cell" process enables the cellular system to perform these tasks. The function detects a fixed subscriber crossing a handoff border upon receipt of an intercell handoff request. However, instead of handing off the subscriber, the function waits for a predetermined time period defined by the operator, and then determines whether or not to drop the call. If a call is an emergency call, or a call to an operator, the Call Out of Cell process may be disabled for the duration of the call.

Figure 1:
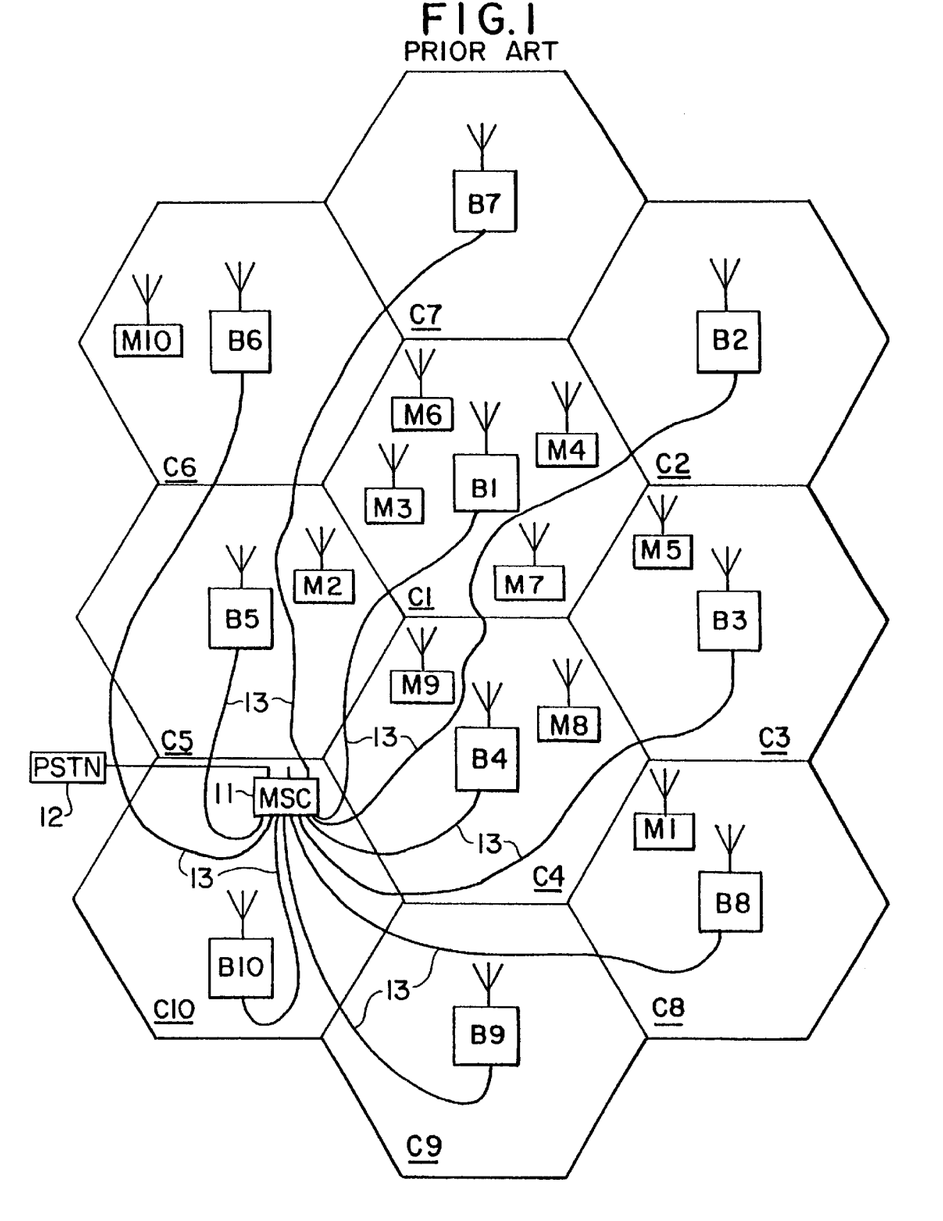
FIG. 1 (Prior art) is a block diagram illustrating components of a cellular radio telecommunication system associated with the present invention.

Referring first to FIG. 1, there is illustrated a conventional cellular radio telecommunication system 10 of the type to which the present invention may generally pertain. In FIG. 1, an arbitrary geographic area may be divided into a plurality of continuous radio coverage areas, or cells C1–C10. Although the system of FIG. 1 is illustratively shown to only include 10 cells, it should be clearly understood that in practice, the number of cells would be much larger.

Associated with and located within each of the cells C1–C10, is a base station designated as a corresponding one of a plurality of base stations B1–B10. Each of the base stations B1–B10 includes a transmitter, receiver, and a base station controller as are well known in the art. In FIG. 1, the base stations B1–B10 are selected to be located at the center of each of the cells C1–C10, respectively, and are equipped with omni-directional antennas. However, in other configurations of a cellular radio system, the base stations B1–B10 may be located near the periphery, or otherwise away from the centers of the cells C1–C10 and may cover the cells C1–C10 with radio signals either omni-directionally or directionally. Therefore, the representation of the cellular radio system of FIG. 1 is for purposes of illustration only and is not intended as a limitation on the possible implementations of a mobile radio telecommunication system within which a mobility restriction process may be implemented.

With continuing reference to FIG. 1, a plurality of mobile stations M1–M10 will be found within the cells C1–C10. Again, only ten mobile stations are shown in FIG. 1, but it should be understood that the actual number of mobile stations will be much larger and, in practice, will invariably greatly exceed the number of base stations. Moreover, mobile stations M1–M10 are illustrated in some of the cells C1–C10. The presence or absence of mobile stations in any particular one of the cells C1–C10 should be understood to depend, in practice on the individual desires of subscribers utilizing the mobile stations M1–M10. Subscribers may roam from one location in a cell to another, or from one cell to an adjacent cell or neighboring cell, and even from one cellular radio system served by a mobile switching center (MSC) 11 to another such system all the while receiving and placing calls both within the cellular system 10 as well as the public switch telecommunication network (PSTN) 12 which is connected to the MSC 11.

Each of the mobile stations M1–M10 is capable of initiating or receiving a telephone call through one or more of the base stations B1–B10 and the MSC 11. Such calls may be either for voice or data communications. The MSC 11 is connected by communication links 13 (e.g., cables) to each of the illustrative base stations B1–B10 and the PSTN 12 or a similar fixed network which may include an integrated services digital network (ISDN) facility (not shown). The relevant connections between the MSC 11 and the base stations B1–B10, or between the MSC 11 and the PSTN 12, are not completely shown in FIG. 1 but are well known to those of ordinary skill in the art. Similarly, it is also known to include more than one mobile switching center (MSC) in the cellular radio system and to connect each additional MSC to a different group of base stations and to other MSCs via cables or radio links.

Each of the cells C1–C10 is allocated a plurality of voice or speech channels and at least one access or control channel, such as a forward control channel (FOCC). The control channel is used to control or supervise the operation of the mobile station by means of information transmitted and received from those units, referred to as messages. Control and administration messages within a cellular radio system are sent in accordance with industry established air interface standards, such as AMPS and EIA/TIA 553, the standards for analog cellular operations, and/or D-AMPS, IS-54B, and IS-136, the standards for digital cellular operations, all of which are hereby incorporated by reference herein. While these standards govern North American operations, similar standards govern other geographic areas throughout the world, and are well known to those skilled in the art.

The information exchanged between base stations and mobile stations via messages, may include incoming call signals, outgoing call signals, paging signals, paging response signals, location registration signals, voice channel assignments, maintenance instructions and handoff instructions as the mobile stations travel out of the radio coverage of one cell and into the radio coverage of other cells, as well as other additional items of information such as calling party numbers, time information, and the like. The control or voice channels may operate in either analog or digital mode or a combination thereof based upon industry standards. Integrated services between different cellular telecommunication systems are provided by using the intersystem specification ANSI-41, which is hereby incorporated by reference herein.

In cellular telecommunication systems in which most control functions are centralized at the MSC 11, the restricted mobility function may be implemented at the MSC. In cellular telecommunication systems in which control functions are more distributed, the restricted mobility function may be implemented partially at the MSC 11, and partially at the system's base stations B1–B10. The description herein focuses on implementation at a MSC 11, although a distributed implementation is also considered to be within the scope of the invention.

Figure 2A:
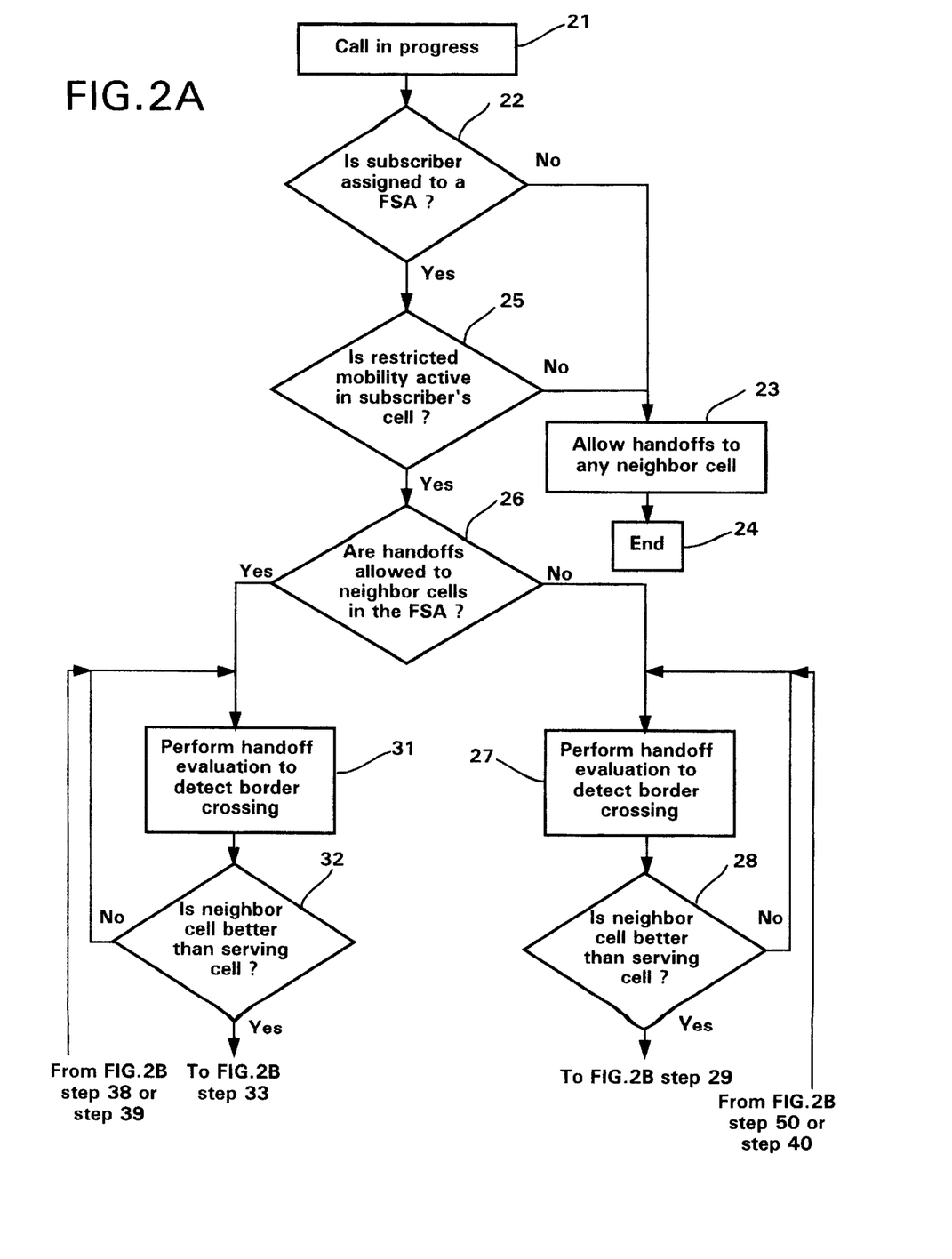
FIGS. 2A and 2B are a flow chart illustrating the functions performed by the present invention when restricting the mobility of a fixed subscriber.
Figure 2B:
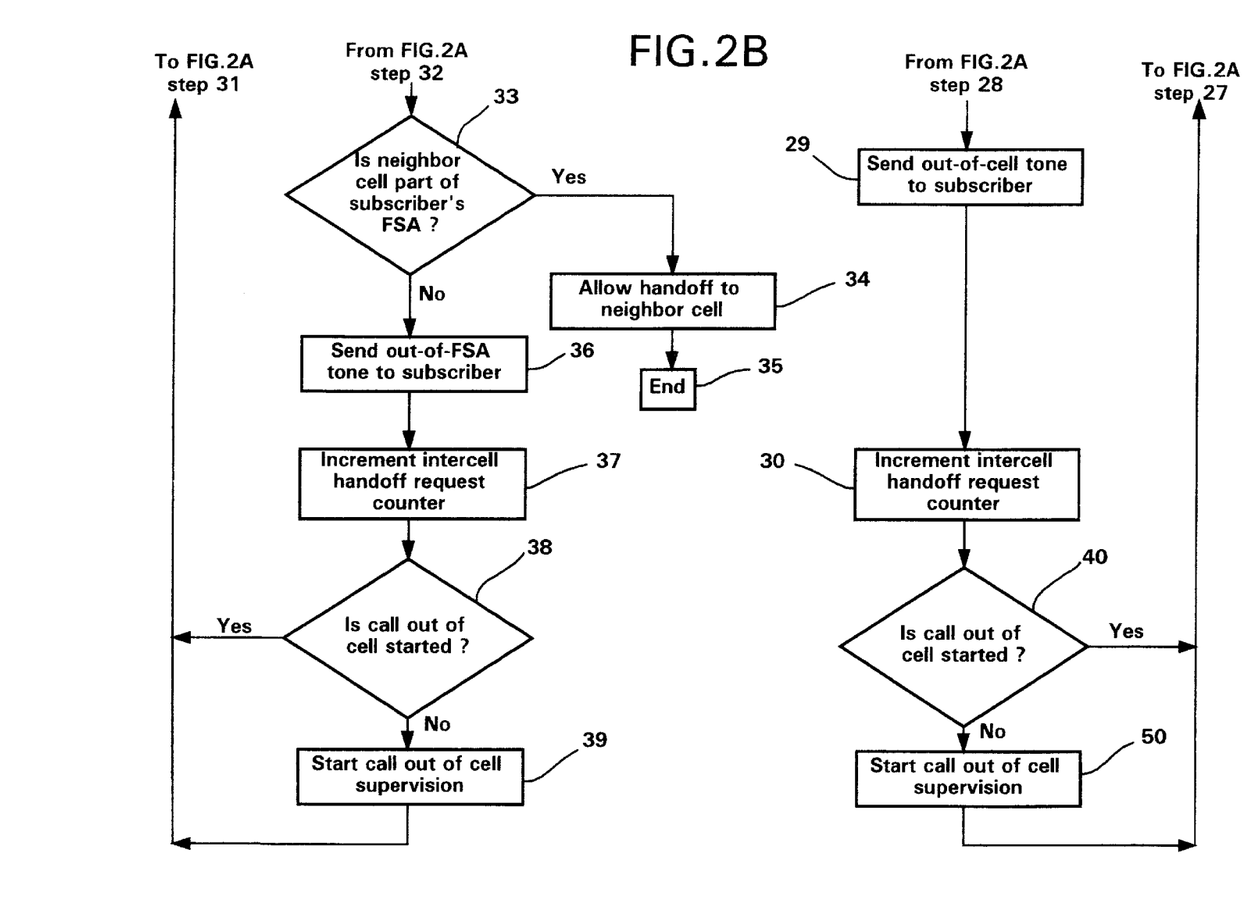

FIGS. 2A and 2B are a flow chart illustrating the functions performed by the present invention when restricting the mobility of a fixed subscriber. At step 21, a subscriber in a cellular telecommunication system is engaged in a call and approaches a cell border. The subscriber may utilize a mobile station having approximately the same radio frequency (RF) transmitter power as all other subscribers, or the power levels may be different, since the present invention does not utilize RF transmitter power or classmarks to differentiate a fixed subscriber from an unrestricted subscriber. Likewise, the cells within the FSA and cells bordering the FSA may be of equal size, or different sizes, since the present invention may restrict subscribers to cells of any size. At step 22, the process determines whether or not the subscriber is assigned to a fixed subscription area (FSA) (i.e., whether the subscriber is a fixed subscriber). The MSC includes a database defining which of the cells in the MSC coverage area are included in the FSA. In addition, the MSC may access a subscriber profile stored in a home location register (HLR) associated with the MSC to determine whether the subscriber is classified as a fixed subscriber. If it is determined that the subscriber is not a fixed subscriber, and is therefore not assigned to a FSA, then the subscriber is a fully mobile (unrestricted) subscriber, and the process moves to step 23 and allows handoffs to any neighbor cell. The process then ends at step 24.

If, however, it was determined at step 22 that the subscriber is a fixed subscriber, the subscriber is restricted to the FSA defined in the MSC if the restricted mobility function is activated. Each system operator may choose whether to restrict the mobility of fixed subscribers engaged in calls; therefore at step 25, the process determines from the MSC whether or not the restricted mobility function is active in the subscriber's serving cell. If restricted mobility is not active, the process moves to step 23 and allows handoffs to any neighbor cell. The process then ends at step 24. However, if the MSC indicates that restricted mobility is active in the subscriber's cell, then the process moves from step 25 to step 26 where it is determined whether or not handoffs are allowed by the operator to neighbor cells that are part of the FSA. If handoffs are not allowed, the process moves to step 27 and performs a handoff evaluation to detect whether the subscriber is crossing a cell border.

The present invention operates with cells of any size. It is not limited, for example, to restricting subscribers with microcellular mobile stations to microcells. Both the serving cell and the neighbor cell may be macrocells, both may be microcells, or there may be one of each type. Thus, mobile stations of any power level may be restricted to cells of any size utilizing the present invention. The process detects a cell-border crossing by determining at step 28 whether or not the neighbor cell is a better cell for serving the mobile station than the currently serving cell. This determination may be made by measuring the relative signal strengths between the mobile station and the base station of the neighbor cell, and between the mobile station and the base station of the currently serving cell. The determination may also be made on the basis of any other measure of voice quality such as, for example, bit error rate, interference level, or carrier-to-interference (C/I) ratio. In digital cellular systems, the handoff evaluation may be performed in the serving base station, with the results being sent to the MSC. In analog cellular systems, the serving base station performs an evaluation of the quality of the serving channel and sends the results to the MSC. The MSC then performs the handoff evaluation. If it is determined at step 28 that the neighbor cell is not better than the serving cell, then the subscriber has not crossed the cell border, and no action is taken. The process returns to step 27 and continues to perform handoff evaluations until it is determined at step 28 that the neighbor cell is better than the serving cell.

Upon a determination that the neighbor cell is better than the serving cell, the process moves to step 29 (FIG. 2B) where an out-of-cell tone is sent to the subscriber to notify the subscriber that he has left his serving cell. The process then moves to step 30 where an intercell handoff request counter is incremented. The process then moves to step 40 where it is determined whether or not the Call Out of Cell process of the restricted mobility function is started. If it is determined that the Call Out of Cell process is started, the process returns to step 27 (FIG. 2A) and continues handoff evaluation. If the Call Out of Cell process is not started, the process moves to step 50 and starts the Call Out of Cell process. The process then returns to step 27 and continues handoff evaluation.

If it is determined at step 26 (FIG. 2A) that handoffs are allowed by the operator to neighbor cells that are part of the FSA, then the process moves to step 31 and performs a handoff evaluation to detect whether the subscriber is crossing a cell border. The process detects a border crossing by determining at step 32 whether or not the neighbor cell is a better cell for serving the mobile station than the currently serving cell. If it is determined at step 32 that the neighbor cell is not better than the serving cell, then the subscriber has not crossed the cell border, and no action is taken. The process returns to step 31 and continues to perform handoff evaluations until it is determined at step 32 that the neighbor cell is better than the serving cell.

Upon a determination that the neighbor cell is better than the serving cell, the process moves to step 33 (FIG. 2B) where it is determined whether or not the neighbor cell is part of the FSA of the subscriber. If the neighbor cell is part of the FSA, then the process moves to step 34 and allows handoff to the neighbor cell. The process then ends at step 35. If the neighbor cell is not part of the FSA, then the process moves to step 36 where an out-of-FSA notification tone is sent to the subscriber. For subscribers with FSAs comprising a single cell, of course, there are no neighbor cells that are part of the area. Therefore, the process always sends such single-cell subscribers a notification tone when they are detected crossing a cell border.

The process then moves to step 37 where an intercell handoff request counter is incremented. The process then moves to step 38 where it is determined whether or not the Call Out of Cell process is started. If it is determined that the Call Out of Cell process is started, the process returns to step 31 (FIG. 2A) and continues handoff evaluation. If the Call Out of Cell process is not started, the process moves to step 39 and starts the Call Out of Cell process. The process then returns to step 31 and continues handoff evaluation.

Figure 3A:
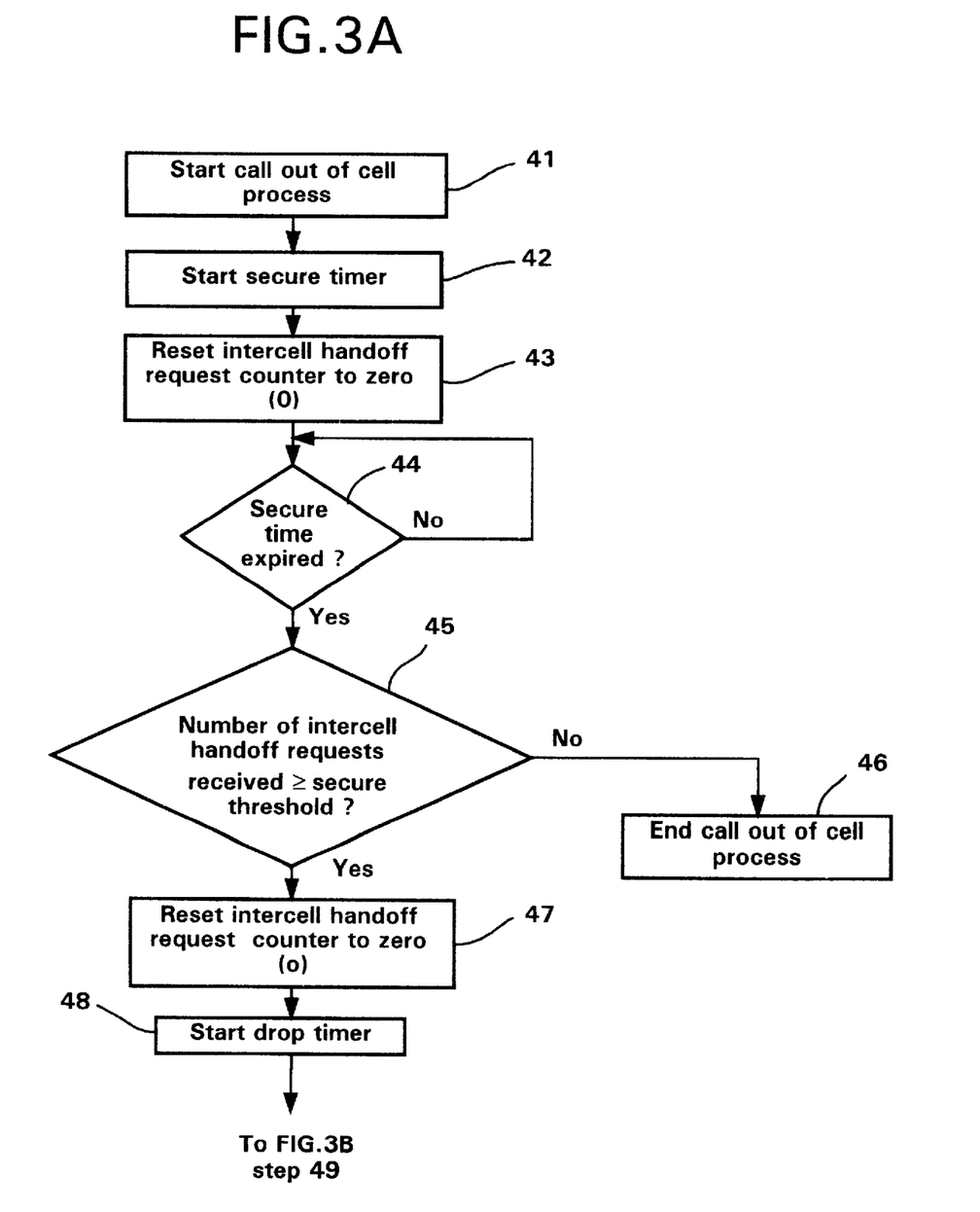
FIGS. 3A and 3B are a flow chart illustrating the functions performed by the Call Out of Cell process in parallel with the functions illustrated in FIGS. 2A and 2B.
Figure 3B:
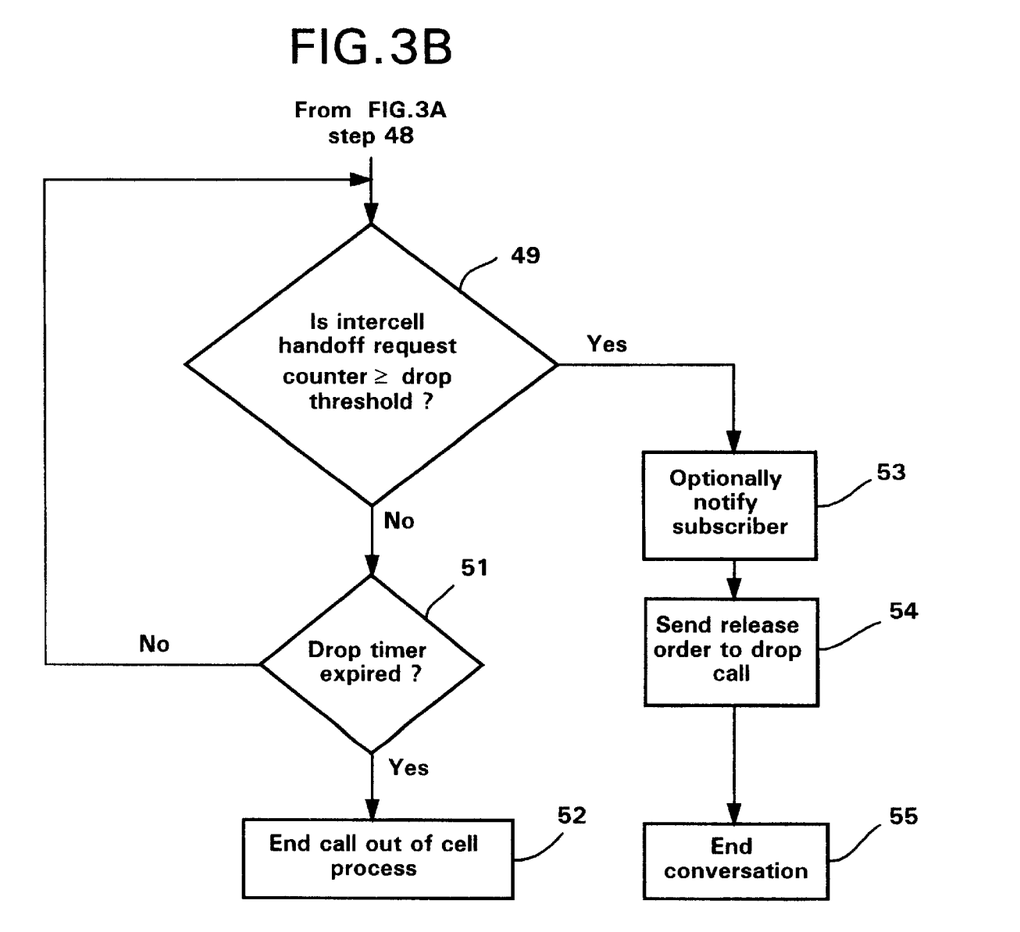

FIGS. 3A and 3B are a flow chart illustrating the functions performed by the Call Out of Cell process in parallel with the functions illustrated in FIGS. 2A and 2B. In the preferred embodiment of the present invention, a time delay is provided after the notification tone is sent to the subscriber before the call is dropped. The notification tone may enable a fixed subscriber who is inadvertently wandering out of his subscription area to stop or reverse course thereby remaining within his authorized area and completing his call. Those fixed subscribers who choose to continue out of the area are provided notification and given a short time to end their conversation before their call is dropped.

After starting the Call Out of Cell process at step 41, a secure timer is started at step 42 if at least one candidate cell has been accepted as a target cell. The secure timer runs for a predetermined time period which may be, for example, in the range of 15–50 seconds. The secure time period is the period during which the subscriber's call is secure from being dropped by the Call Out of Cell process. An exemplary value of 20 seconds is described herein for illustrative purposes.

At step 43, an intercell handoff request counter is reset to zero (0) and the process thereafter records the number of intercell handoff requests received during the secure time period. At step 44 the process determines whether or not the secure time period has expired. If not, the process remains at step 44 and continues to record the number of intercell handoff requests until the 20-second secure timer expires. At the expiration of the secure time period, the process moves to step 45 and determines whether or not the number of intercell handoff requests received at the MSC during the 20 seconds is greater than or equal to a predetermined secure threshold which may be set, for example, in the range of 3–15 handoff requests during the secure time period. An exemplary value of 3 handoff requests is described herein for illustrative purposes. If the number of handoff requests received is less than 3 during the 20-second secure time period, the Call Out of Cell process ends at step 46. If, however, it is determined at step 45 that the number of handoff requests received at the MSC was equal to or greater than 3, then the process moves to step 47 where the intercell handoff request counter is reset to zero (0). At step 48, a drop timer is started and the process moves to step 49 in FIG. 3B.

The drop timer runs for a predetermined time period after which the call may be dropped by the Call Out of Cell process. The drop time period may be, for example, in the range of 4–10 seconds. An exemplary value of 5 seconds is chosen for description herein. While the drop timer runs, the process records the number of intercell handoff requests received. At step 49 it is determined whether or not the intercell handoff request counter is greater than or equal to a predetermined drop threshold which may be, for example, in the range of 1–3 handoff requests during the drop time period. An exemplary value of 1 handoff request is described herein for illustrative purposes. If the number of handoff requests received is less than 1 during the 5-second drop time period (e.g., no handoff requests are received), the process moves to step 51 where it is determined whether or not the drop time period has expired. If not, the process returns to step 49 and continues to compare the number of intercell handoff requests with the drop threshold. If the drop timer has expired, the Call Out of Cell process ends at step 52.

If, however, it is determined at step 49 that the intercell handoff request counter was greater than or equal to 1, then the process moves to step 53 and optionally notifies the subscriber through a voice message stating that the subscriber's call is being dropped because he has traveled out of his authorized cell. Thereafter, a release order is generated at step 54 and the conversation ends at 55.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A cellular telecommunication system having a plurality of cells and a plurality of subscribers utilizing cellular telephones of approximately equal radio frequency transmitter power to access said cellular system, said plurality of subscribers including at least one fixed subscriber assigned to a fixed subscription area (FSA) engaged in an ongoing call in a serving cell, said system comprising:

a mobile switching center (MSC) which includes a database defining which of said plurality of cells are included in said FSA;

a home location register (HLR) that stores a subscriber profile for each of said plurality of subscribers, each subscriber profile identifying whether an associated subscriber is a fixed subscriber;

means for sending an inquiry from said MSC to said HLR to determine whether a subscriber is a normal subscriber or a fixed subscriber;

a plurality of base stations electronically connected to said MSC, each of said base stations transmitting radio frequency signals over a coverage area defining one of said cells, and receiving radio frequency signals from said cellular telephones of approximately equal radio frequency transmitter power; and a restricted mobility function for restricting said on-going call of said fixed subscriber to said FSA.

2. The cellular telecommunication system of claim 1 wherein said restricted mobility friction includes means for detecting when said fixed subscriber is crossing a cell border between said serving cell and a neighbor cell.

3. The cellular telecommunication system of claim 2 wherein said restricted mobility function includes means for dropping said on-going call of said fixed subscriber when said fixed subscriber is detected crossing a cell border between said serving cell and a neighbor cell which is located outside said FSA.

4. The cellular telecommunication system of claim 3 further comprising means for determining whether handoffs are allowed from said serving cell to said neighbor cell when said neighbor cell is located in said FSA.

5. The cellular telecommunication system of claim 4 further comprising means for allowing handoff of said fixed subscriber from said serving cell to said neighbor cell when said neighbor cell is located in said FSA, and up on determining that handoffs are allowed from said serving cell to said neighbor cell when said neighbor cell is located in said FSA.

6. The cellular telecommunication system of claim 5 wherein said means for dropping said on-going call of said fixed subscriber includes:

means for determining whether a threshold has been exceeded; and means for generating a release order upon determining that said threshold has been exceeded.

7. The cellular telecommunication system of claim 6 wherein said means for determining whether a threshold has been exceeded includes:

a secure timer for defining a secure time period during which said means for dropping said on-going call is prohibited from dropping said call;

means for recording the number of intercell handoff requests received during said secure time period; and means for determining whether the number of intercell handoff requests received during said secure time period is greater than or equal to a predetermined secure threshold.

8. The cellular telecommunication system of claim 7 wherein said means for determining whether a threshold has been exceeded further comprises:

a drop timer for defining a drop time period;

means for starting said drop timer upon determining that the number of intercell handoff requests received during said secure time period is greater than or equal to said predetermined secure threshold;

means for recording the number of intercell handoff requests received during said drop time period; and means for determining whether the number of intercell handoff requests received during said drop time period is greater than or equal to a predetermined drop threshold.

9. The cellular telecommunication system of claim 1 further comprising means for allowing handoffs of each of said plurality of subscribers that are not assigned to a FSA to any neighbor cell.

10. In a cellular telecommunication system having a serving mobile switching center (MSC), a home location register (HLR), a plurality of cells and a fixed subscription area (FSA), a method of restricting an on-going call of a fixed subscriber to said FSA, said method comprising the steps of:

receiving radio frequency transmissions from a plurality of subscribers utilizing cellular telephones of approximately equal radio frequency transmitter power to access said cellular system, said plurality of subscribers including said fixed subscriber assigned to said FSA;

defining, in a subscriber profile stored in said HLR, whether each of said plurality of subscribers is a fixed subscriber assigned to said FSA;

detecting when one of said plurality of subscribers is crossing a cell border between a serving cell and a neighbor cell;

sending an inquiry from said serving MSC to said HLR to determine whether said subscriber crossing the cell border is a fixed subscriber assigned to said FSA;

determining, from a database in said MSC, whether said neighbor cell is located in said FSA; and dropping said on-going call of said fixed subscriber upon determining that said subscriber crossing the cell border is a fixed subscriber assigned to said FSA and said neighbor cell is located outside said FSA.

11. The method of restricting said on-going call of said fixed subscriber to said FSA of claim 10 further comprising the step of determining whether handoffs are allowed from said serving cell to said neighbor cell when said neighbor cell is located in said FSA.

12. The method of restricting said on-going call of said fixed subscriber to said FSA of claim 11 further comprising the step of allowing handoff of said fixed subscriber from said serving cell to said neighbor cell upon determining that said neighbor cell is located in said FSA, and upon determining that handoffs are allowed from said serving cell to said neighbor cell when said neighbor cell is located in said FSA.

13. The method of restricting said on-going call of said fixed subscriber to said FSA of claim 12 wherein said step of dropping said ongoing call of said fixed subscriber includes the steps of:

determining whether a threshold has been exceeded; and generating a release order upon determining that said threshold has been exceeded.

14. The method of restricting said on-going call of said fixed subscriber to said FSA of claim 13 wherein said step of determining whether a threshold has been exceeded includes the steps of:

defining a secure time period during which said means for dropping said on-going call is prohibited from dropping said call;

recording the number of intercell handoff requests received during said secure time period; and determining whether the number of intercell handoff requests received during said secure time period is greater than or equal to a predetermined secure threshold.

15. The method of restricting said on-going call of said fixed subscriber to said FSA of claim 14 wherein said step of determining whether a threshold has been exceeded further comprises:

defining a drop time period;

staring said drop time period upon determining that the number of intercell handoff requests received during said secure time period is greater than or equal to said predetermined secure threshold;

recording the number of intercell handoff requests received during said drop time period; and determining whether the number of intercell handoff requests received during said drop time period is greater than or equal to a predetermined drop threshold.

16. The method of restricting said on-going call of said fixed subscriber to said FSA of claim 10 further comprising the step of allowing handoffs of each of said plurality of subscribers to any neighbor cell upon determining that each of said plurality of subscribers is not assigned to a FSA.

17. A cellular telecommunication system having a plurality of cells and a plurality of subscribers, said plurality of subscribers including at least one fixed subscriber assigned to a fixed subscription area (FSA) engaged in an on-going call in a serving cell, said system comprising:

a mobile switching center (MSC) which includes a database defining which of said plurality of cells are included in said FSA;

a home location register (HLR) that stores a subscriber profile for each of said plurality of subscribers, each subscriber profile identifying whether an associated subscriber is a fixed subscriber;

means for sending an inquiry from said MSC to said HLR to determine whether a subscriber is a normal subscriber or a fixed subscriber;

a plurality of base stations electronically connected to said MSC, each of said base stations transmitting radio frequency signals over a coverage area defining one of said cells; and a restricted mobility function for restricting said on-going call of said fixed subscriber to said FSA.

18. The cellular telecommunication system of claim 17 wherein the coverage areas of the cells within the FSA, and of cells bordering the FSA, are of approximately equal size.

19. The cellular telecommunication system of claim 18 further comprising means for detecting when one of said plurality of subscribers is crossing a cell border between the serving cell and a neighbor cell.

20. The cellular telecommunication system of claim 19 wherein the serving cell and the neighbor cell are both macrocells.

21. In a cellular telecommunication system having a serving mobile switching center (MSC), a home location register (HLR), a plurality of cells and a fixed subscription area (FSA), a method of restricting an on-going call of a fixed subscriber to said FSA, said method comprising the steps of:

receiving radio frequency transmissions from a plurality of subscribers utilizing mobile stations to access said cellular system, said plurality of subscribers including said fixed subscriber assigned to said FSA;

defining, in a subscriber profile stored in said HLR, whether each of said plurality of subscribers is a fixed subscriber assigned to said FSA;

detecting when one of said plurality of subscribers is crossing a cell border between a serving cell and a neighbor cell;

sending an inquiry from said serving MSC to said HLR to determine whether said subscriber crossing the cell border is a fixed subscriber assigned to said FSA;

determining, from a database in said MSC, whether said neighbor cell is located in said FSA; and dropping said on-going call of said fixed subscriber upon determining that said subscriber crossing the cell border is a fixed subscriber assigned to said FSA and said neighbor cell is located outside said FSA.

22. The method of restricting an on-going call of a fixed subscriber to a FSA of claim 21 wherein said step of detecting when one of said plurality of subscribers is crossing a cell border between a serving cell and a neighbor cell includes detecting when one of said plurality of subscribers is crossing the cell border when the serving cell and the neighbor cell are of approximately equal size.

23. The method of restricting an on-going call of a fixed subscriber to a FSA of claim 22 wherein said step of detecting when one of said plurality of subscribers is crossing a cell border between a serving cell and a neighbor cell of approximately equal size includes detecting when one of said plurality of subscribers is crossing the cell border when the serving cell and the neighbor cell are both macrocells.

24. The method of restricting an on-going call of a fixed subscriber to a FSA of claim 22 wherein said step of detecting when one of said plurality of subscribers is crossing a cell border between a serving cell and a neighbor cell of approximately equal size includes detecting when one of said plurality of subscribers is crossing the cell border when the serving cell and the neighbor cell are both microcells.

25. The method of restricting an on-going call of a fixed subscriber to a FSA of claim 21 wherein said step of detecting when one of said plurality of subscribers is crossing a cell border between a serving cell and a neighbor cell includes detecting when one of said plurality of subscribers is crossing the cell border when the serving cell is a macrocell, and the neighbor cell is a microcell.

* * * * *